Dec. 7, 1954  K. LEHOVEC  2,696,513
SOLID STATE BATTERY
Filed July 1, 1953
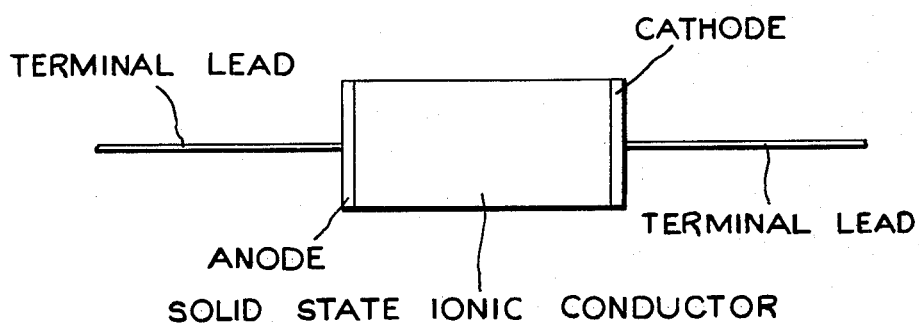
INVENTOR.
KURT LEHOVEC
BY
*Connolly and Hutz*
HIS ATTORNEYS

United States Patent Office 2,696,513
Patented Dec. 7, 1954

2,696,513

SOLID STATE BATTERY

Kurt Lehovec, Williamstown, Mass., assignor to Sprague Electric Company, North Adams, Mass., a corporation of Massachusetts Application July 1, 1953, Serial No. 365,476

2 Claims. (Cl. 136—83)

The present invention relates to a new and improved type of electrical battery which is primarily designed for use with electronic devices, such as, transistors.

In the prior art the shelf life of electrical batteries of type above has been limited to a substantial extent by the rate of inter-diffusion of the oxidizing and reducing agents used with the battery construction. One direct method of increasing the shelf life of these primary cells is to insert a membrane of comparatively low permeability between the active ingredients in the cathode and anode of such a cell. In general, this procedure has not been too successful because such barriers introduced a great deal of internal resistance within the cells, cutting down the effective power available.

With the event of electronic devices, such as transistors, a demand has arisen for small electric batteries which are capable of generating a material voltage, but which do not generate a large amount of current. Thus, with the primary cells for use with this latter type of device, there is no harm in inserting a barrier of relatively high resistance between the anode and the cathode because by so doing, it is possible to produce a cell capable of generating a substantial voltage and low current.

An object of the present invention is to overcome certain of the disadvantages of the presently known battery structures discussed above. A further advantage of the invention is to produce a new and improved type of electrical battery which can be satisfactorily used over a comparatively wide range of temperatures. Further objects of the invention, as well as the advantages of it, will be apparent from this specification, the appended claims, as well as the accompanying drawing wherein there is diagrammatically pictured a new cell of the instant invention.

Briefly, these objects are achieved by utilizing as a barrier layer between a metallic anode, a non-metallic cathode, and a crystalline composition which is known to conduct an electric current by migration of ions at the temperatures at which any cell produced is designed to be used, the conductivity in this crystalline barrier layer being increased by the presence of lattice defects within the host material.

For convenience, it is preffer to term the various metals which can be used with the present invention as anodes as electron donors, because of the fact that these metals, in carrying out the reaction of the primary cell, are in effect electron donors. Broadly, any metal having a low electronegativity or a comparatively low ionization potential is suitable with the present invention. It is preferred to utilize only metals such as calcium, lithium, strontium, sodium, barium, potassium, rubidium, cesium, and the like, which have electronegativities below about 1.0 on Pauling's scale. Obviously, certain of the metals indicated are highly reactive, and must be kept away from the moisture within the atmosphere in order to prevent the formation of hydroxides and hydrogen. Such formation can be prevented effectively by the use of inert films of one sort or another so as to cover these metals. Frequently, it is advisable to have an electrode tab in touch with such metals and projecting beyond the confines of the primary cell unit per se with the entire cell being encased in an appropriate moisture-proof resinous or glass casing. The electron donors used with the invention can either be applied to the ionic conductor employed as barrier layers by cathode sputtering or the like, or can consist of self-supporting layers of metal physically placed in contact with these ionic barriers.

The crux of the present invention is in the precise composition of the crystalline barrier materials. Monocrystalline barriers are preferable for use with the invention, although polycrystalline barriers are satisfactory. It has been found that the conductivity of such barriers can be increased decidedly by the incorporation within the crystalline lattice of a "defect" type compound in which at least one type of atom possesses a different valence from a second atom within the host material, the first atom being capable of being substituted for the second atom in the crystalline lattice of the latter. As an example of this, the conductivity of a silver chloride barrier layer for use with the present invention can be substantially increased by incorporating within this material a small proportion up to about 10% by weight of the total composition of cadmium chloride. In this case the cadmium ions fit into the spaces normally occupied by the silver atoms in the crystalline structure of the silver chloride, although they tend to distort this structure somewhat, placing it under permanent conditions of strain. The secondary "defect" atoms added do not come from the same group of the periodic table as the atom being replaced within the crystalline lattice, and are of such a size that a mixed crystal can be formed with a minimum of difficulty. Suitable mixed crystals are formed in the manner described in Glasstone's treatise on physical chemistry, or Buckley's text entitled "Crystal Growth" published in 1951 by John Wiley and Sons, Inc.

As an example of further compositions capable of use with the invention, up to 15% by weight of calcium chloride may be substituted within a mercurous chloride crystalline layer in the formation of a satisfactory barrier material. Similarly, antimony chloride in the amount of 10% can be placed within the crystalline structure of lead chloride (plumbic) in the formation of satisfactory barrier. Similarly, about 12% by weight of bismuth chloride may be substituted within a zinc chloride crystalline structure. Similarly, equivalent amount of bismuth chloride may be substituted within a barium chloride crystalline lattice in the formation of a satisfactory barrier layer according to the invention.

The active compounds forming the cathodes of the present invention are best termed electron acceptors because they tend to accept electrons during operation of the primary cells of the invention. In general, any non-metal capable of oxidation of any of the electron donors specified above can be used with the instant invention. It is preferred, however, to use non-metals having electronegativity of 2.4 or more on Pauling's scale of electronegativity. Such suitable non-metals include fluorine, oxygen, chlorine, nitrogen, bromine, iodine, and the like. Because all of the non-metals specifically listed above are gaseous in nature, some means must be employed to hold them in contact with the surface of the ionic barrier layer employed. This is frequently and easily accomplished by causing these non-metals to be absorbed upon surface layers of carbon black or other forms of carbon possessing similar absorption and conductive properties. Various "platinized" surfaces, including the surface of platinum, itself, can also be employed for such purposes. The supporting surfaces used to absorb these non-metals must in all cases be sufficiently conductive so as to enable satisfactory electrical connection to be made. Frequently, to improve the conductance of the cathode, the specific electron acceptor gases used can be admixed with, and partially absorbed by, solids, such as are mentioned in U. S. Patent No. 2,631,180, lines 48 to 58, which exercise inherently a small amount of conductivity, particularly when moistened with water.

It must be realized that the active compounds forming the cathodes of the invention are not limited to gaseous elements which are absorbed upon an inert material. It is quite within the present invention to utilize oxidizing agents such as cupric chloride, cupric bromide, cupric iodide, and similar materials which are not gaseous in nature. For certain high temperature applications, during which the absorbent would tend to lose the gaseous material formed in the cathode, these latter suggested cathodes would be necessary for successful and more beneficial operation of the present invention.

It will be realized by those skilled in the art that a number of minor ancillary features of the invention have not been specifically spelled out in this disclosure. This has been done because it is not believed to be necessary to list any and all possible modifications of a conventional nature which would occur to one skilled in the art. As an example of such modifications, the individual primary cells of the invention can be stacked into a series unit. Further, the cathode surface of the barrier ionic conductors of the invention can be roughened as with a cathode beam or other apparatus, so as to be capable of absorbing the various electron acceptors directly. All manner of casing devices, etc. can be used with various constructions falling within the scope of this inventive concept. The specific materials and compounds listed above are not to be considered as limited to inventive concept in any manner as those skilled in the art once advised as to the nature of the invention can readily find substantial equivalents in the chemical literature. One highly satisfactory cell system of the type herein indicated includes the use of lead as an electron donor, solid lead chloride crystals as the ionic conductor barrier and oxygen absorbed on activated carbon as the cathode.

As a further example of an embodiment of my invention a barrier material of silver chloride containing lead chloride in the amount of 10% is interposed between an anode of silver and a cathode of lead. As the energy of the unit is released in the form of electrical current the electrochemical reaction is such that the silver from the anode which is converted into the silver ion migrates into the adjacent surface of the barrier material to form silver chloride and the lead plates out onto the surface of the cathode. Alternatively, a battery having a silver anode and a lead cathode has imposed between it as the conducting medium a layer of silver chloride and an intimately bonded layer of lead chloride. If these crystalline structures are prepared from their respective chlorides having introduced into them an amount of impurity to effectively change the conductance of the crystalline structure so as to bring it within the scope of the present invention, this latter embodiment will not suffer the decrease in conductance which is eventually noticed with the prior embodiment, wherein the impurity plates use onto the cathode structure.

In reference to the drawing there is diagrammatically pictured an illustration of this invention wherein the primary cell is shown comprising an anode, a cathode, and an ionic crystalline conductor positioned between the two poles.

As many apparently widely different embodiments of my invention may be made without departing from the spirit and scope hereof, it is to be understood that my invention is not limited to the specific embodiments hereof except as defined in the appended claims.

What is claimed is:

1. A new and improved primary cell which comprises an anode, a cathode, an ionic conductor positioned between said anode and said cathode, said ionic conductor being a crystallized compound possessing lattice defects.

2. A new and improved variety of primary cell which comprises a metallic cathode of comparatively low electronegativity, an ionic crystalline conductor possessing lattice defects positioned adjacent to said cathode, and a non-metal anode positioned adjacent to said ionic conductor.

No references cited.